July 16, 1963   J. A. BRYANT II, ET AL   3,097,724
ROTARY LATCH MECHANISM FOR MACHINE TOOLS
Filed Nov. 2, 1961   3 Sheets-Sheet 1
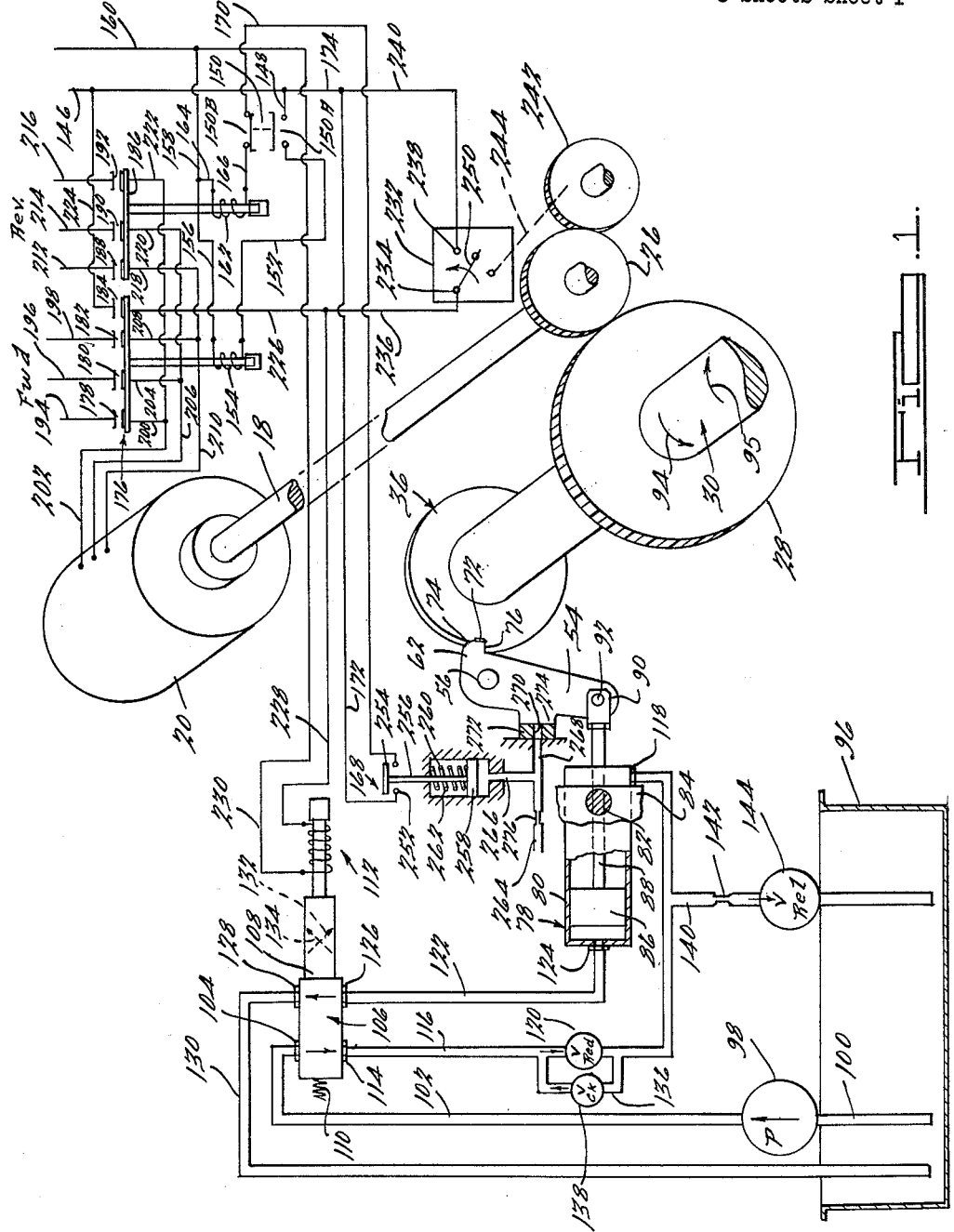
INVENTORS
John A. Bryant, II
Guy D. Pierce
BY
Harness, Dickey & Pierce
ATTORNEYS

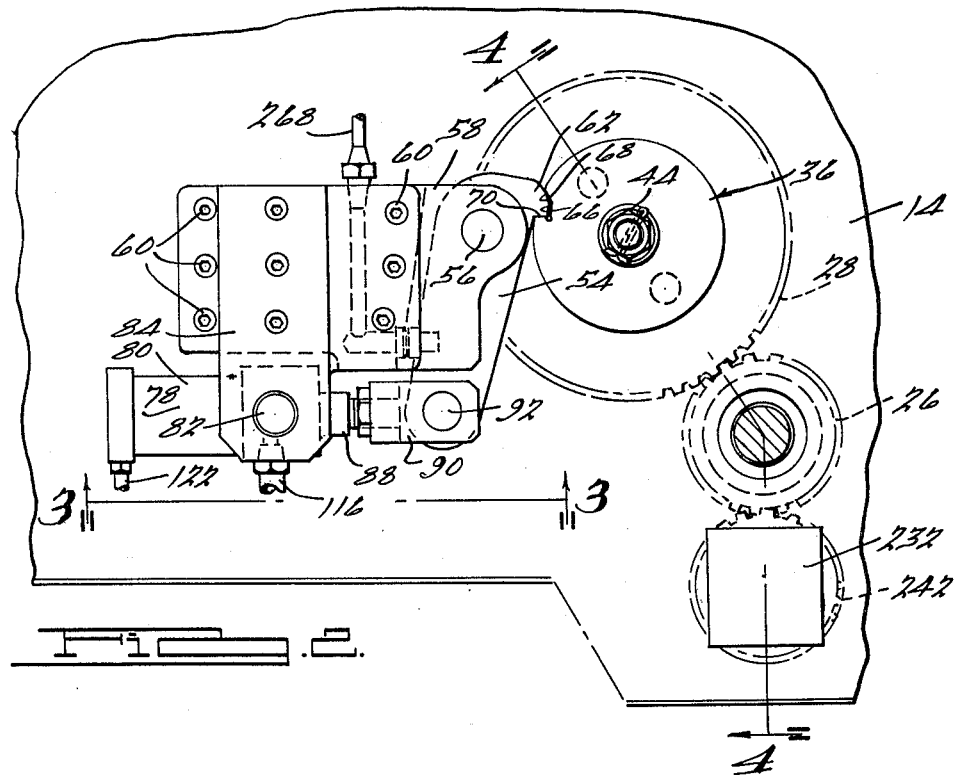

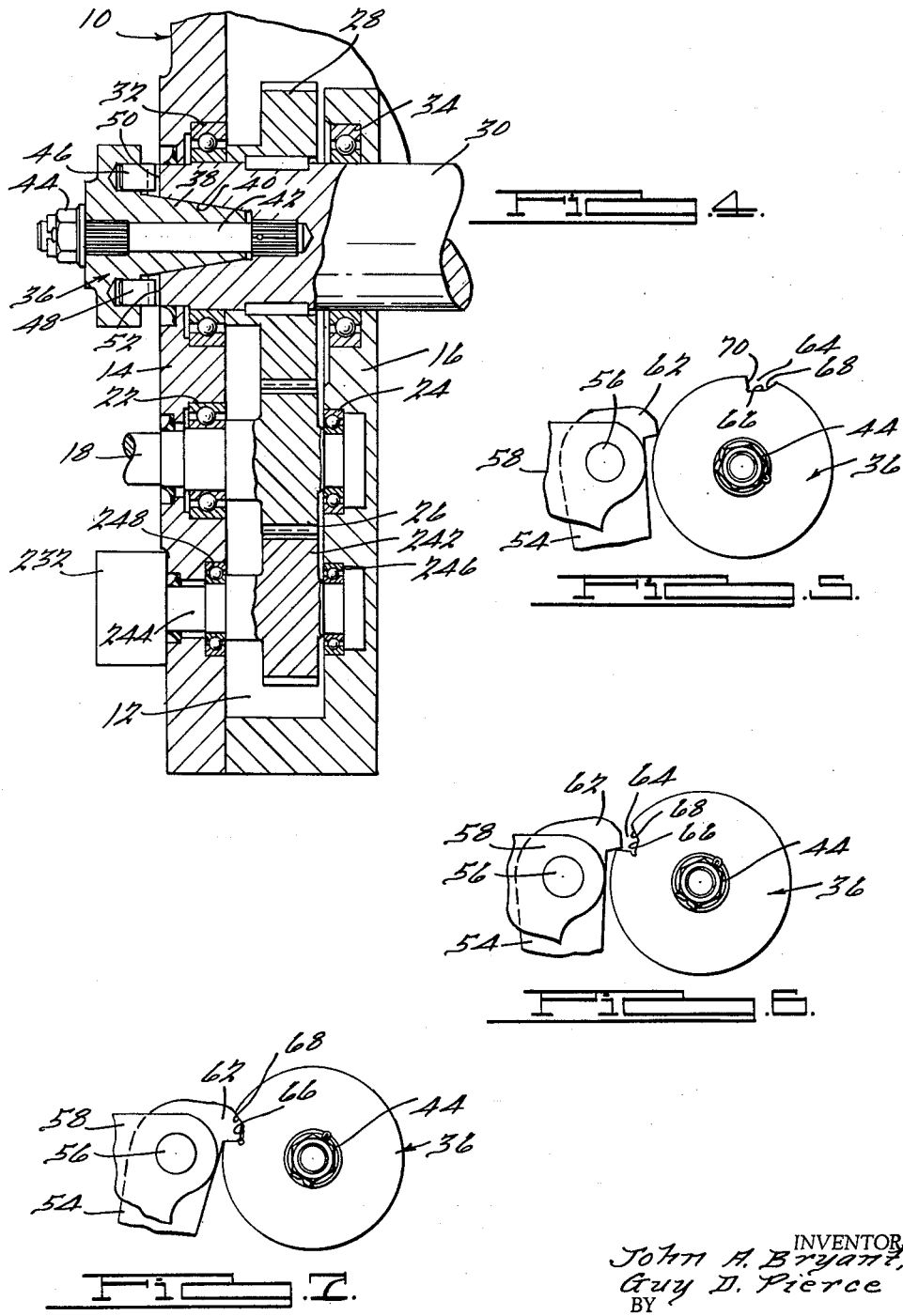

United States Patent Office 3,097,724
Patented July 16, 1963

3,097,724
ROTARY LATCH MECHANISM FOR
MACHINE TOOLS
John A. Bryant II, Grosse Pointe Farms, and Guy Donald Pierce, Franklin, Mich., assignors to The Cross Company, Fraser, Mich., a corporation of Michigan
Filed Nov. 2, 1961, Ser. No. 149,729
15 Claims. (Cl. 188—82.7)

This invention relates to a rotary latch mechanism for stopping and holding high inertia rotatable parts such as machine spindles for example and in such manner that the spindle and parts associated therewith are disposed or oriented accurately in a predetermined angular or rotative position.

As suggested, the rotary latch mechanism of this invention is primarily adapted and pre-eminently suited for use in the machine tool field but it, of course, is not limited to this particular application. In a typical situation, it may be necessary to stop the work spindle of a machine to permit prompt removal of the work from the chuck, and it sometimes is necessary or desirable to stop the work in a predetermined rotative position so that the work is properly presented to and received by a transfer device or the like. Similarly, it may be necessary to stop a tool spindle in a predetermined rotative position so that the tool carried thereby is presented properly to the work or so that it clears parts of the work that otherwise would interfere with the tool as the tool slides move in the operating cycle of the machine. Either or both of these operations may, of course, be necessary or desirable, depending on the exigencies of the particular situation. In any event, it is desirable to stop the spindles as quickly as possible after the work is performed and the machine has completed its cycle so as to keep the total cycle time as short as possible and correspondingly to increase the production of the machine.

Heretofore, the practice has been to permit the rotating spindles to slow down and finally stop at the end of each operating cycle of the machine or to stop the spindles by suitable braking devices. However, the elapsed time of the machine cycle is unduly extended if the spindles are simply permitted to coast to a stop and neither of the above expedients stop the spindles in a particular predetermined rotative position.

It has been proposed to stop rotation of a spindle by jamming a stop or dog against a shoulder or into a recess in the spindle or an associated part. However, because of the large mass and considerable inertia of the spindle assembly, it has been necessary to wait until rotation of the spindle has practically stopped in order to avoid damage to the parts and even then it is difficult to stop and hold the spindle and its associated workpiece or tool securely in a particular rotative position because of the extremely large mass and weight of the rotating parts. Also, if the spindle is rotating too slowly when the latch is engaged, there may not be sufficient inertia in the rotating parts to carry over to the final latched position. Moreover, this practice does not adequately reduce the operating cycle time of the machine. The problem, therefore, is to provide a stop mechanism that will rotatably position a heavy massive rotating part such as a machine spindle assembly so as to utilize as little as possible of the cycle time of the machine.

An important object of the present invention is to provide a rotary latch mechanism for machine spindles and the like that can be engaged with the spindle while the latter is rotating at a higher speed than heretofore without damaging the latching device and that will position the spindle and its associated parts accurately in a predetermined angular or rotative position.

Considered in certain of its broader aspects, the latch mechanism of this invention comprises a spindle or associated part having mounted thereon a latch plate provided with a locking portion engageable by a suitable latch which holds the spindle and its appurtenances in a predetermined angular or rotative position, the latching mechanism being uniquely constructed to permit engagement of the latch with the latch plate while the spindle is rotating at relatively high speed, to absorb the kinetic energy of the spindle assembly, and finally to stop and position the spindle accurately in a selected rotative position.

The latch normally is disengaged from the latch plate and is moved against the locking portion of the plate to hold it securely in a predetermined rotative position by a fluid motor. A pressure relief valve in the fluid system which serves the motor operates to prevent excessive back pressure in the system by impact forces created when the rotating latch plate strikes the latch. In practice, the latch is pivotally mounted and the fluid motor is connected thereto so that operation of the motor rocks a locking dog portion on the latch into engagement with the latch plate. The initial impact load resulting from the engagement transmitted back to the fluid system through the latch and the fluid motor, and as this force is absorbed by the fluid in the system, excessive pressure is relieved by the pressure relief valve so as to prevent damage of the latch, the latch plate or other parts. Also, the latch plate is permitted to override the final locked position against the action of the latch and the fluid motor so as to reduce the impact shock of the engagement and to permit the kinetic energy of the spindle assembly to be gradually absorbed, but it is not permitted to override sufficiently so that the locking portion of the latch plate disengages the latch completely. Thereafter, continued pressure exerted on the latch by the fluid motor returns the latch plate and the spindle assembly associated therewith to a desired predetermined angular position and holds the same locked securely in this position until completion of the machine cycle.

In use, the latch mechanism of this invention is capable of reducing the time required to stop the spindle after the forward rotary drive to the spindle is cut off by as much as one-half, and the reduction in the machine cycle time thus effected is of course reflected in a corresponding increase in the production of the machine and a corresponding reduction in the manufacturing cost of the part produced by the machine.

In the drawing, forming a part of this specification, and wherein like numerals are employed to designate like parts throughout the same, FIGURE 1 is a diagrammatic view showing an assembly of the rotary latch mechanism and necessary control apparatus therefor;

FIG. 2 is a fragmentary elevational view showing the latch mechanism on a machine spindle;

FIG. 3 is a sectional view taken on the line 3—3 of FIG. 2;

FIG. 4 is a sectional view taken on the line 4—4 of FIG. 2;

FIG. 5 is a view showing the relative positions of the latch and latch plate during normal operation of the machine;

FIG. 6 is a view similar to FIG. 5 but showing the manner in which the latch plate overrides the latch to absorb kinetic energy of the spindle assembly; and FIG. 7 is a view similar to FIGS. 5 and 6 but showing the latch and latch plate in the final locked position.

In the drawing, wherein for the purpose of illustration is shown a preferred embodiment of the invention, the numeral 10 designates a housing for the spindle of a machine tool. As the stop mechanism of this invention is adaptable to any of a large number and variety of machine tools, only a fragmentary portion of the housing 10 is shown. In fact, only the mounting for one end of the spindle and part of the case containing the gears which rotatably drive the spindle are actually shown (FIG. 4).

The gear case 12 has spaced, parallel supporting walls 14 and 16, and the drive shaft 18 of a reversible electric motor 20 (FIG. 1) extends through the wall 14 and is supported for rotation by bearings 22 and 24 recessed into opposite walls of the case. Fixed on the drive shaft 18 within the gear case 12 is a gear 26 which meshes with a gear 28 keyed to or otherwise fixed on a machine spindle 30 which also extends through the case and is supported for rotation by bearings 32 and 34 set into the walls 14 and 16, respectively.

As shown, the spindle 30 extends from the case 12 and is adapted to mount a chuck for a workpiece, cutting tool, or the like. However, as the instant invention is not concerned with the particular purpose of the spindle 30, only the driven end of the latter is shown. It will readily be appreciated in this connection that the spindle 30 can be either translatable or nontranslatable. Work spindles usually are nontranslatable, and in this event the housing 10 can be considered to be part of the main base casting of the machine. On the other hand, tool spindles frequently are translatable and in this event, the housing 10 can be considered to be part of the tool head or slide.

As suggested, the present invention is concerned only with means for stopping rotation of the spindle 30 after the driving motor 20 has been shut off or de-energized. It is contemplated that the stop mechanism be applied either directly to the spindle or to a shaft which is rotatably connected to the spindle. When viewed in that light, the shaft 30 can, if desired, be considered to be either the spindle or some other shaft in the spindle drive assembly. However, the shaft 30 is here considered to be a spindle. It is so referred to in this specification and the latch or stop mechanism of this invention is shown attached directly thereto.

Specifically, the stop mechanism comprises a latch plate 36 fixed to the end of the spindle 30 at the outer side of the gear case 12. To insure a strong rigid driving connection between the spindle 30 and the latch plate 36, the latter is formed with a tapered hub portion 38 which extends into a correspondingly tapered socket 40 in the end of the spindle. A splined connector 42 extends axially through the plate 36 and into the spindle 30. A nut 44 on the outer end of the connector 42 holds the plate 36 on the spindle 30, and drive pins 46 and 48 carried by the plate extend into and snugly fit radial grooves 50 and 52 in the end of the spindle to provide a rotary driving connection therebetween.

A latch 54 is rockably mounted on a pivot 56 which is carried by a mounting bracket 58 fastened to the wall 14 by screws 60. As perhaps best shown in FIG. 2, the latch 54 is disposed in a generally upright position laterally of the latch plate 36 so that a laterally extending locking dog portion 62 at the upper end of the latch can be moved into and out of engagement with the periphery of the latch plate 36 by rocking movement of the latch on the pivot 56. A recess 64 in the periphery of the latch plate 36 receives the dog 62 to stop rotation of the plate and spindle 30 and to rotatably or angularly position the same. In this connection, it will be observed that the periphery of the plate 36 extends in a generally helical path with respect to the center of the plate from the recess 64. The recess itself has a flat bottom surface 66. A tapered side wall 68 extends from the bottom 66 to the low side of the peripheral surface. The opposite side extends generally radially of the plate 36 to the high side of the peripheral surface to provide a stop shoulder 70.

Similarly, the latch dog portion 62 has a flat blunt end 72 that is engageable with and bears on the periphery of the plate 36. At one side of the end surface 72, the dog 62 is formed with a tapered side 74 that seats on and complements the tapered wall 68 when the dog is received in and accommodated by the recess as shown in FIG. 1, and under these circumstances the flat under surface 76 of the dog 62 seats against and flatly engages the stop shoulder 70. Preferably, the end 72 is spaced from the bottom of the recess 64 to assure a wedging entry of the dog 62 and simultaneous engagement of the mentioned sides 74 and 76 with the opposite sides of the recess 64.

Pivotal actuation of the latch 54 to move the dog 62 into and out of engagement with the latch plate 36 is effected by a fluid motor 78 (FIG. 1). The cylinder 80 of the motor 78 is connected by a pivot 82 to a supporting arm 84 which is fastened to and extends from the mounting bracket 58 (FIG. 2). Mounted for reciprocation in the cylinder 80 is a piston 86 having a piston rod 88 which extends from the cylinder and is fastened to the lower end of the latch 54 by a clevis connection 90 and pivot 92. When the piston 86 is moved to the right as viewed in the drawing, the latch 54 is rocked on the pivot 56 to move the dog 62 out of recess 64 and radially outwardly from the periphery of the latch plate as shown in FIG. 5. Contrariwise, when the piston 86 is moved to the left as viewed in the drawing, the latch 54 is rocked on the pivot 56 to move the dog 62 against the periphery of the latch plate 36 and into the recess 64.

In practice, the reversible motor 20 normally drives the spindle 30 in a counterclockwise direction as indicated by the arrow 94 in FIG. 1, and when it is desired to stop the spindle assembly the motor 20 is reversed under relatively low voltage. The reverse voltage slows and finally stops forward rotation of the spindle and then reverses its rotation as indicated by the arrow 95 in FIG. 1. When forward rotation of the spindle becomes sufficiently slow, the fluid motor 78 is operated to move piston 86 to the left so that the end face 72 thereof engages the periphery of the latch plate 36. Thereafter, during forward rotation of the spindle, the dog 62 simply ratchets over the stop shoulder 70 as and in the event the recess 64 moves into register with the dog. Then, when the direction of rotation reverses, the stop shoulder 70 moves until it engages the under radial side 76 of the dog and this stops the plate 36 and the spindle 30.

In use, the shoulder 70 strikes the dog 62 with sufficient force to rock the latch 54 in a counterclockwise direction. The dog 62 actually rocks or rolls on the outer edge of the shoulder 70, and this rocking motion of the latch 54 is of course resisted by fluid pressure in the cylinder 80 ahead of the piston 86. Additional and excessive pressure thus created in the fluid system is relieved by a suitable relief valve in a manner hereinafter described. It will be apparent however that the overriding motion of the latch plate 36 permits the kinetic energy of the moving mass and the shock of the initial impact forces to be absorbed gradually through the latch 54 and the fluid motor 78. The latching apparatus is regulated and adjusted so that stop shoulder 70 is never permitted to override the dog 62 completely. Fluid pressure in the cylinder 80 ahead of piston 86 and in the fluid system which serves the cylinder continues to exert pressure on the stop shoulder 70 and this pressure substantially immediately forces the latch plate 36 back so that the dog 62 can enter the recess 64 and seat solidly on the sides 68 and 70 thereof to hold the spindle 30 securely in the predetermined angular or rotative position. In this connection it will be readily apparent that wedging action exerted by the tapered side 74 of the latch dog 62 against the correspondingly tapered side 68 of the recess 64 positions and securely holds the spindle 30 and the workpiece or tool carried thereby.

The fluid system and the electrical control circuits which operate the mechanical parts of the latch mechanism hereinabove described are shown in FIG. 1 of the drawing.

The hydraulic system is described first. Specifically, hydraulic liquid is taken from a reservoir 96 by a suitable pump 98 through an inlet pipe 100. Liquid discharged by the pump 98 is carried by a pipe 102 to the inlet port 104 of a spring loaded solenoid operated four-way valve 106. The latter is a conventional valve having an inner core 108 which normally is positioned as shown in the drawing by a spring 110 and is slidably actuated against the spring 110 by a solenoid 112. When the core 108 is positioned as shown in the drawing, hydraulic liquid is discharged through an outlet port 114 and thence into a pipe 116 which connects with a port 118 at the forward end of the cylinder 80 and ahead of the piston 86. A reducing valve 120 in pipe 116 between the four-way valve 106 and the fluid motor 78 maintains the line pressure of the hydraulic liquid at the fluid motor at a desired pressure less than full pump pressure and determines the force exerted by the latch 54 against the latch plate 36 to rotatably position and to hold the spindle 30. The pipe 122 connects a port 124 in the cylinder 80 behind the piston 86 with a port 126 in the four-way valve 106 which, when positioned as shown in the drawing, connects with a port 128 and a pipe 130 which leads back to the reservoir 96.

When the core 108 of four-way valve 106 is shifted to the left by energization of the solenoid 112, the port 104 is connected to the port 126 as indicated by the arrow 132 and the port 114 is connected to the port 128 as indicated by the arrow 134. Thus, in this position of the valve, hydraulic liquid from the pump 98 enters the fluid motor 78 behind the piston 86 to move the latter to the right and fluid in the cylinder 80 ahead of the piston is returned to the reservoir 96 through pipes 116 and 130. In this latter event, liquid flows unrestrictedly past the reducing valve 120 through a bypass 136 and a check valve 138 therein. As shown in the drawing, the check valve 138 is adapted to unseat or open when the front end of the fluid motor 78 is connected to the low pressure side of the system and to close or seat to confine flow of liquid through the reducing valve 120 when the front end of the fluid motor is connected to the pump 98.

It is a feature of the invention that the pipe 116 is provided between the fluid motor 78 and the reducing valve 120 with a branch pipe 140 which leads back to the reservoir 96. An orifice 142 in the branch pipe 140 restricts the amount of flow through the pipe and a relief valve 144 prevents hydraulic liquid in the system from returning to the reservoir through the branch pipe 140 until pressure in that part of the system exceeds a predetermined amount. In practice, the relief valve 144 remains closed under normal operating conditions of the fluid system and, during operation of the fluid motor 78 to rock the latch 54 into and out of engagement with the latch plate 36. However, when the shoulder 70 strikes the latch dog 62 and during overriding travel of the latch plate counterclockwise rocking of the latch 54 exerts a pull on the piston 46 which increases the pressure in the cylinder 80 ahead of the piston 86 and in the pipe 116 between the fluid motor 78 and the check valve 138, and this sudden surge of pressure is relieved by the valve 144. The orifice 142 of course should be sufficiently small so that hydraulic liquid cannot flow too rapidly from the system when the relief valve 144 opens, as this would cause the shoulder 70 to override the latch dog 62 completely. A proper setting of the relief valve 144 in combination with a proper size of orifice 142 permits just sufficient liquid to spurt from the system to relieve the impact shock load occasioned when the latch plate 36 first strikes the latch 54 without permitting the latch plate to completely override the latch; and, as soon as this initial shock load is absorbed by the system, the relief valve 144 closes so that the restored hydraulic pressure in the system can pull the heavy massive spindle assembly back to the desired rotative position and hold it securely in that position.

The electrical circuitry for operating the motor 20 and other components of the apparatus hereinabove described comprises a main conductor 146 which extends from a suitable source of 110 volt alternating current to a conductor 148 which connects with the contacts 150A of a main switch 150. As shown, the switch 150 is movable between the contacts 150A and the contacts 150B, and it is contemplated that this be done either manually or automatically. A conductor 152 extends from the switch contacts 150A to the forward starter coil 154 of the motor 20 and conductors 156, 158 and 160 lead back to the current source. Similarly, the reverse starter coil 162 of the motor 20 is connected to a conductor 158 and the main line conductor 160 by a conductor 164 and to one side of the contacts 150B by a conductor 166. The other side of the switch contacts 150B is connected to the main line conductor 146 through an air operated switch 168 by conductors 170, 172, and 174.

The forward starter coil 154 actuates a gang switch 176 having separate contacts 178, 180, 182 and 184. The reverse starter coil 162 operates a gang switch 186 having separate contacts 188, 190 and 192. The forward starter contacts 178, 180 and 182 are connected to a suitable source of high voltage current by conductors 194, 196 and 198 respectively and to the motor 20 by conductors 200—202, 204—206, and 208—210. 440 volt current is usually supplied to the motor 20 to operate a machine spindle of the type here under consideration. Similarly, the reverse starter contacts 188, 190 and 192 are connected to a suitable source of reduced voltage by conductors 212, 214 and 216. Specifically, a conductor 218 connects the contact 188 to conductor 210; a conductor 220 connects the contact 190 to the conductor 206; and a conductor 222 connects the contact 192 to conductor 202. Manifestly, closure of the gang switch 176 drives the motor 20 in a forward direction and closure of the gang switch 186 drives the motor 20 in a reverse direction. The reduced voltage for reverse rotation of the motor 20 and spindle 30 should be low enough to keep the impact loading of the latch mechanism within reason and high enough to make a reasonable cycle time. In practice, a reduced voltage in the order of 180–200 volts has been found to be satisfactory.

As disclosed above, the gang switch 176 has four contacts and the last contact 184 is connected to one side 146 of the 110 volt line by a conductor 224. Contact 184 also is connected to the solenoid 112 which operated the hydraulic valve 106 by conductors 226 and 228. A conductor 230 extends from the solenoid 112 to the side 160 of the 110 volt line. From the foregoing, it will be apparent that the solenoid 112 remains energized to hold the latch 54 out of engagement with the latch plate 36 as long as the forward starter coil 154 is energized and the gang switch 176 is closed.

It is desirable of course that the valve 106 not reverse to engage the latch 54 with the latch plate 36 immediately after the forward starter coil 154 is deenergized and while the spindle 30 is rotating at a relatively high speed. Accordingly, the control circuitry of this apparatus also includes a speed sensitive plugging switch 232 which keeps the valve 106 from shifting to engage the latch 54 until after the main switch 150 has been moved to drop out the forward starter coil 154 and to energize the reverse starter coil 162, and further until the spindle 30 has slowed down sufficiently to permit the latch 54 to engage the latch plate 36 without danger. To this end, the conductor 228 is connected to one terminal 234 of the plugging switch 232 by a conductor 236, and the other terminal 238 of the plugging switch is connected to the conductor 174 by a conductor 240. The switch arm 242 of the plugging switch 232 is mechanically connected to and rotatably driven by a gear 242 carried by a shaft 244.

As shown in FIG. 4, the gear 242 is disposed in the gear case 12 and in mesh with gear 26, and the shaft 244 is supported for rotation by spaced bearings 246 and 248. Thus the plugging switch 232 is directly responsive to the rotational speed of the spindle 30. In practice, the pivoted switch arm 250 of the switch 232 remains open, as shown in FIG. 1, so long as the spindle 30 and consequently the shaft 244 is rotatably driven at a speed greater than the speed to which the switch 232 responds. However, as soon as the rotative speed of the spindle 30 and shaft 244 drops to a predetermined maximum speed, the switch arm 250 closes making contact with the contact 238 and closing a circuit through the plugging switch 232.

Another special feature of the control circuitry is the air operated switch 168 which is normally closed and which remains closed all of the time the spindle 30 is rotating in a forward direction and during reverse rotation of the spindle and initial operation of the latch mechanism. However, as soon as the latch dog 62 moves fully into the recess 64 to locate the latch plate 36 and the spindle 30 positively in the final rotative position, the switch 168 opens automatically to drop out the reverse starter coil 162 and shut off power to the driving and actuating parts of the apparatus.

Specifically the switch 168 has stationary contacts 252 adapted to be bridged by a movable contact 254 which is connected by a rod 256 to a piston 258 in an air cylinder 260. A spring 262 in the cylinder 260 behind piston 258 holds the latter normally advanced in the cylinder to close switch 168. A conduit 264 for air under pressure is connected to the cylinder 260 ahead of the piston 258 by a branch line 266 and also is connected by a branch 268 to an orifice 270 in a button or stop 272 positioned to be engaged by an abutment 274 on the latch 54. An orifice 276 in the air supply line 264 regulates the amount of air flowing through the line to the cylinder 260 and orifice 270 and prevents an excessive loss of air when the latch 54 is disengaged from the latch plate 36. On all occasions when the latch 54 is disengaged from the latch plate 36, the abutment 274 is away from the button 272 and the orifice 270 is opened to atmosphere. Air in the line 264 at the right of orifice 276, as viewed in FIG. 1, therefore is maintained low enough so that it cannot move the piston 258 against the spring 262 to open switch 168. However when the latch 54 moves to the final closed position in the recess 64 the abutment 274 seats flatly against the button 272 to close the orifice 270. When this occurs, the latter no longer can vent to atmosphere and pressure builds up in the line 264 to the right of the orifice 276 and in the cylinder 260 ahead of the piston 258 sufficiently to overcome the spring 262 and to raise the piston 258 sufficiently to open the switch 168.

In FIG. 1 the apparatus of this invention is shown at the end of an operating cycle with the latch 54 engaged to locate and hold the spindle 30 and its appurtenances in a selected predetermined rotative position. To start the operating cycle of the machine and of the latching apparatus, the main switch 150 is actuated to close the contacts 150A and to open the contacts 150B. As suggested, this can be done manually by the machine operator or automatically by a suitable part of the machine such as a tool slide or a transfer device, for example. In any event, as soon as the main switch 150 has been actuated to close the contacts 150A, a circuit is completed through the forward starter coil 154 which then closes the gang switch 176 and energizes the motor 20 for forward rotation. Immediately upon closure of gang switch 176, a circuit is completed also through contact 184 to the solenoid 112 which is energized to shift the hydraulic valve 106 to the left. This, in turn, actuates the fluid cylinder 78 to disengage the latch 54 from cam plate 36 and to permit forward rotation of the spindle assembly 30 and its appurtenances. As the latch 54 rocks to disengage the latch plate 30 the abutment 274 separates from the button 272 to open the orifice 270 and close the air operated switch 168. The latter operation however is without effect as the switch 168 is connected to the main line conductors 146 and 160 through the main switch contacts 150B which at that time are open.

As soon as the machine completes its cycle at least to the point of doing whatever is to be done to the workpiece, the main switch 150 is moved to open the contacts 150A and simultaneously to close the contacts 150B. Here again the main switch 150 can be operated either manually or automatically by some suitable part of the machine. In any event as soon as the contacts 150A open, the forward starter 154 is deenergized and the gang switch 176 is opened. Simultaneously, the reverse starter coil 162 is energized. This, of course, closes the gang switch 186 and applies a reverse torque to the motor 20 which slows the forward rotation of the spindle, stops it and then reverses its direction of rotation. The hydraulic cylinder 106 is not shifted immediately upon actuation of the main switch 150 however as the solenoid 112 remains energized through the plugging switch 232. This switch of course remains closed so long as the spindle 30 is rotating at relatively high speed. However, when the forward rotational speed of the spindle 30 drops below a predetermined amount the plugging switch 232 opens and drops out the solenoid 112 which then permits the spring 110 to shift the hydraulic valve 106 to the position shown in FIG. 1. Actuation of the valve 106 connects hydraulic pressure from the pump 98 to the cylinder 80 ahead of the piston 86 and this in turn actuates the hydraulic motor 78 to move the latch 54 into engagement with the latch plate 36. If the latch 54 engages the latch plate 36 while the spindle 30 is rotating in a forward direction it simply ratchets over the stop shoulder 70 without entering the recess 64. However, if the plugging switch 232 is set properly this action will occur for only a few revolutions of the spindle 30. The latter will stop its forward rotation with the latch 54 at some random point on the periphery of the latch plate 36 and as the motor 20 rotates the spindle 30 and the latch plate 36 in a reverse direction the shoulder 70 will move into contact with the latch dog 62 sometime during the first revolution of the latch plate. During this part of the operation, the air operated switch 168 remains closed as the abutment 274 is held away from the button 272 until such time as the latch dog 62 actually enters the recess 64 and seats against the side walls 68 and 70 thereof. However, as soon as the latch dog 62 drops into the recess 64, the abutment 274 seats on the button 272 blocking the air orifice 270 and causing air pressure to build up in the cylinder 260 ahead of the piston 258 sufficiently to overcome the resistance of spring 262 and open the air operated valve 168. This action interrupts the circuit through the reverse starting coil 162 and deenergizes the motor 20. The latter of course remains deenergized until such time as the main switch 150 is again actuated to close the contact 150A. In the meantime, the latch 54 remains securely locked with the latch plate 36 and holds the spindle 30 in the selected rotative position.

Having thus described the invention, we claim:

1. A rotary latch mechanism for machine spindle assemblies and the like, comprising a latch plate rotatable with the spindle assembly and having a locking portion, a latch normally disengaged from said latch plate movable against the locking portion thereof to hold the same in a rotatably locked position, and a fluid system including means for maintaining fluid pressure in the system, a fluid motor connected to said latch and operative by fluid pressure in the system to move the latch into and out of engagement with the locking portion of said latch plate, and a pressure relief device communicating with said fluid motor and operative when said locking portion engages said latch to relieve pressure in the system sufficiently to permit said latch plate to override said locked position against the action of said latch and said fluid motor so as to reduce the impact shock of said engagement but not sufficiently to permit the locking portion of said latch plate to override and disengage said latch completely or to prevent the latch and said motor from pulling the overriding latch plate back to the locked position.

2. The combination as set forth in claim 1 wherein the locking portion of said latch plate has a radial shoulder disposed to engage the latch whereby to stop rotation of the latch plate and cooperable with said latch to hold said latch plate in the locked position.

3. The combination as set forth in claim 1 wherein said latch plate has a peripheral recess which receives said latch to stop rotation of said latch plate and to hold the latter in the locked position.

4. The combination as set forth in claim 1 wherein said latch plate has a peripheral recess which receives said latch to stop rotation of said latch plate and to hold the latter in the locked position, and wherein one side of said recess extends radially outwardly beyond the other side thereof to define a shoulder against which said latch engages initially to stop rotation of said latch plate.

5. The combination as set forth in claim 1 wherein said latch plate has a peripheral recess which receives said latch to stop rotation of said latch plate and to hold the latter in the locked position, the sides of said recess tapering inwardly of the latch plate and said latch having a laterally extending locking dog portion provided with tapered surfaces which engage and complement the sides of the recess to hold said latch plate in the locked position.

6. The combination as set forth in claim 1 wherein said latch is pivotally mounted and has a laterally extending locking dog portion and wherein the locking portion of said latch plate is in the form of a peripheral recess, one side of said recess extending generally radially of the latch plate and radially outwardly of the other side of said recess to provide a shoulder against which the locking dog of said latch engages to stop rotation of said latch plate.

7. The combination as set forth in claim 1 wherein said latch is pivotally mounted and has a laterally extending locking dog portion and wherein the locking portion of said latch plate is in the form of a peripheral recess, one side of said recess extending generally radially of the latch plate and radially outwardly of the other side of said recess to provide a shoulder against which the locking dog of said latch engages to stop rotation of said latch plate, said other side of said recess being tapered to release said locking dog portion during overriding action of said latch plate and said locking dog portion having a correspondingly tapered surface adapted to seat on the tapered side of said recess to hold said latch plate securely in the locked position.

8. The combination as set forth in claim 1 including a motor for rotatably driving said latch plate, and a control circuit for said motor including switch means operably connected to said latch and movable to a circuit closing position when said latch is disengaged from said latch plate and to a circuit opening position when said latch is engaged with said latch plate to hold the same in the locked position.

9. The combination as set forth in claim 1 including a reversible motor for rotatably driving said latch plate, forward and reverse control circuits for said motor including a main switch for selectively, individually energizing said forward and reverse control circuits, an air-operated switch means in the reverse control circuit of said motor operable by said latch to selectively able and disable reverse operation of said motor, said air-operated switch means being movable to close said reverse control circuit and to able reverse operation of said motor when said latch is disengaged from said latch plate and movable to open said reverse control circuit and disable reverse operation of said motor when said latch is engaged with said latch plate to hold the latter in the locked position.

10. The combination as set forth in claim 1 including a reversible motor for rotatably driving said latch plate, a control circuit for said motor including a forward starter circuit operable to rotate said latch plate in a forward direction and a rear starter circuit operable to rotate said latch plate in a reverse direction, a main switch in said control circuit for selectively, individually energizing said forward starter circuit and said reverse starter circuit, and a solenoid operated hydraulic valve in said fluid system and said control circuit operable to actuate said fluid motor to hold said latch disengaged from said latch plate when said forward starter circuit is selectively energized by said main switch to rotate said latch plate in a forward direction and operable to actuate said fluid motor to engage said latch with said latch plate when said reverse starter circuit is selectively energized by said main switch.

11. The combination as set forth in claim 1 including a reversible motor for rotatably driving said latch plate, a control circuit for said motor including a forward starter circuit and a reverse starter circuit, a main switch means for selectively, individually energizing said forward starter circuit and said reverse starter circuit, a solenoid operated valve in said fluid system and said forward starter circuit for actuating said fluid motor to move said latch selectively into and out of engagement with said latch plate, and a plugging switch responsive to the rotational speed of said latch plate and in circuit with the actuating solenoid of said valve operable to hold said latch disengaged from said latch plate during relatively high speed forward rotation of the latter and to engage said latch with said latch plate during relatively slow speed forward rotation of said latch plate.

12. The combination as set forth in claim 1 including a reversible motor for rotatably driving said latch plate, a control circuit for said motor including a forward starter circuit and a reverse starter circuit, a main switch means for selectively, individually energizing said forward starter circuit and said reverse starter circuit, a solenoid operated valve in said fluid system and said forward starter circuit for actuating said fluid motor to move said latch selectively into and out of engagement with said latch plate, a plugging switch responsive to the rotational speed of said latch plate and in circuit with the actuating solenoid of said valve operable to hold said latch disengaged from said latch plate during relatively high speed forward rotation of the latter and to engage said latch with said latch plate during relatively slow speed forward rotation of said latch plate and switch means in said reverse starter circuit operable by movement of said latch into locking engagement with said latch plate for disabling said reverse starter circuit.

13. The combination as set forth in claim 1 including a reversible motor for rotatably driving said latch plate, a control circuit for said motor including a forward starter circuit and a reverse starter circuit, main switch means for selectively, individually energizing said forward starter circuit and said reverse starter circuit, and means responsive to operation of said main switch to energize said forward starter circuit operable to move and hold said latch out of engagement with said latch plate.

14. The combination as set forth in claim 1 including a reversible motor for rotatably driving said latch plate, a control circuit for said motor including a forward starter circuit and a reverse starter circuit, main switch means for selectively, individually energizing said forward starter circuit and said reverse starter circuit, and means responsive to operation of said main switch to energize said forward starter circuit operable to move and hold said latch out of engagement with said latch plate and means responsive to operation of said main switch to energize said reverse starter circuit including speed sensitive means for holding said latch out of engagement with said latch plate during relatively high speed forward rotation of the latter and for moving said latch into engagement with said latch plate during relatively slow speed forward rotation and reverse rotation of said latch plate.

15. The combination as set forth in claim 1 including a reversible motor for rotatably driving said latch plate, a control circuit for said motor including a forward starter circuit and a reverse starter circuit, main switch means for selectively, individually energizing said forward starter circuit and said reverse starter circuit, means responsive to operation of said main switch to energize said forward starter circuit operable to move and hold said latch out of engagement with said latch plate, means responsive to operation of said main switch to energize said reverse starter circuit including speed sensitive means for holding said latch out of engagement with said latch plate during relatively high speed forward rotation of the latter and for moving said latch into engagement with said latch plate during relatively slow speed forward rotation and reverse rotation of said latch plate and means responsive to locked engagement of said latch with said latch plate for disabling said reverse starter circuit.

No references cited.